United States Patent Office 3,515,539
Patented June 2, 1970

3,515,539
METHOD FOR PRODUCING FINELY DIVIDED POWDERS
Richard J. Wethern, San Francisco, Calif., assignor of thirty percent to David B. Mogilefsky and twenty percent to Richard E. Peterson, both of San Francisco, Calif.
No Drawing. Filed Dec. 30, 1965, Ser. No. 517,792
Int. Cl. B22f 9/00
U.S. Cl. 75—.5     15 Claims

ABSTRACT OF THE DISCLOSURE

Finely divided sub-micronic particles are produced by (1) forming a homogeneous solution of metallic ions with polymer-forming constituents, (2) polymerizing the mixture to a solid mass incorporating the metallic ions on an ionic scale, and (3) thermally degrading the polymer completely and recovering the particles. Thermal degradation may be either (a) charring the polymer in an inert atmosphere to produce a mixture of carbon particles and metal-containing particles, (b) charring the polymer and oxidizing it to produce metal oxide particles, or (c) charring and oxidizing as in (b) and then reducing the oxide particles to metal particles.

---

This invention relates to a method for producing finely divided powders and to the powders so produced.

Finely divided powders are desirable in many fields, and the art is replete with efforts to produce finer and still finer powders, many of which are useful as pigments, ferrites, or ceramic bodies.

Characteristics and uses of the product of the invention

The present invention enables the production of sub-micronic particles, i.e., particles which are characteristically smaller than one micron in diameter. By the methods of the invention, primary yields of particles typically about one-tenth of a micron in diameter are obtained.

A particularly significant feature of this invention is that by it not only are sub-micronic metal and metal oxide particles produced, but the particles can be of a very high purity. Little, if any, impurity is introduced by the process itself, and starting materials of great purity which are readily available for a wide variety of substances, can be used to give comparable purity in the final product, which is typically a metal or a metal oxide.

Another unusual, interesting and important feature of the invention is its ability to produce alloys, ferrites, oxide blends, and metal and oxide blends in sub-micronic sizes. The minute particles are apparently precisely formulated and chemically identical.

The novel particles of this invention have many uses. New magnetic inks, improved sintered bearings, better porous-electrodes for fuel cells, and new xerographic pigments are a few of the many new products that can be made from the product of this invention; others will occur at once to those who have sought for very finely divided particles of great purity and accurate formulation. No previously known method appears to be able to produce such products.

Brief resumé of the prior art processes of producing fine powders

The technology of producing fine powders may be broadly classified into two general types of processes: those which are basically mechanical (e.g., grinding) and those which are essentially physico-chemical or chemical, as in the present invention. The drawbacks to mechanical processing techniques have for some time led to emphasis on chemical processing, the previous work on which may be illustrated by three prior-art processes: a spray process described in U.S. Pat. No. 2,900,244, a precipitation process described in U.S. Pat. No. 3,069,292 and a flash drying process described in U.S. Pat. No. 2,893,859.

The spray process involved spraying a solution on a heated surface. It produced small metal oxide crystals that were then mechanically broken down or else were reduced first (increasing the particle size) and were then mechanically treated. Particle sizes were said to be smaller than four microns for the oxides, with half of them smaller than one micron. For the metals obtained by reduction, the sizes were said to be smaller than 10 microns, with half of them smaller than four microns. Thus, the particle sizes were larger than those obtained from the present invention. Moreover, the process was limited to the use of metal salts having thermally unstable anions, and the process produced only crypto-crystalline oxides. The present invention is capable of smaller sizes in particles, does not require mechanical treatment, enables the use of a much wider variety of starting materials, and produces stabilized structures with a much wider range of end products.

Many precipitation processes are known, some quite good for the intended purposes, but all have been liable to contamination, all have been complicated, and all have been limited to rather narrow choices of starting materials and to a few end products.

Flash drying has required grinding after obtaining an initial powder, whereas no grinding is required in the present invention.

The invention broadly

The present invention forms extremely fine powders of high purity and applies to a wide variety of metals, alloys, metal oxides, mixtures of metal oxides, solid solutions of oxides, and to mixtures of oxides and metal.

In simple terms, the process comprises (1) formation of a homogeneous solution of metallic ions with polymer-forming constituents, (2) polymerizing the mixture to a solid mass incorporating the metallic ions on an ionic scale, and (3) thermally degrading the polymer, usually under or followed by oxidative conditions. Oxidative thermal degrading can be followed by reduction where metals are desired instead of oxides.

(1) Formation of homogeneous polymerizable solution of metal ions—The primary solvent The initial step is the formation of a homogeneous solution of the necessary starting constituents, the term "solution" meaning here a uniform three-dimensional spatial distribution of the starting constituents, as a solute, in a liquid phase, herein called the primary solvent. The solute may be ions or molecules or groups of either. The primary solvent may be a single substance (e.g., water or ethanol) or a combination or mixture of substances (e.g., 90% $H_2O$ and 10% $CH_2OH$). Water is usually preferred where possible. The term "solution," as used here, is intended to include both true solutions, colloidal solutions, and colloidal suspensions. In other words, by "solution" is meant the formation of a homogeneous liquid phase between the solute and the primary solvent; no attempt is made to differentiate the solution process in terms of fundamental process, whether due to physical causes, or due to chemical reactions.

The solute includes all of the constituents of the starting solution necessary to the practice of this invention and has three basic ingredients: (a) a metal compound or compounds, usually a salt or salts, (b) polymer forming materials, and (c) extenders.

(a) The solute salt: The primary function of the solute salt or salts is to contain the desired end-product atoms.

A single salt may be used when a finely powdered pure metal or metal oxide is the desired end product, and a single complex salt or a mixture of salts is normally used when a finely powdered alloy, oxide mixture, or mixture of metals or alloys is the desired end product, an important feature of this invention being its ability to produce very finely divided particles of alloys and ferrites and other precisely formulated products.

Either organic or inorganic salts may be used, and no differentiation or limitation is placed on the choice of salt by its relative ionic character; i.e., in the term "salts" are included both (1) true ionic salts which largely dissociate in solution into a cation and anion and (2) covalent compounds which (in the particular solvent under consideration) do not show appreciable dissociation into ions. Where a salt is used which exhibits appreciable ionic character in the solvent being utilized, the desired end-product atoms may be contained within either the cation or the anion; the other ion, which does not contain the desired end product atom, is used as a "carrier" ion. Examples of ionic inorganic and organic salts usable in this invention are the metal halides, nitrates, and acetates. An example of a salt which does not have a large degree of ionic character is bis (orthoaminophenol) cobalt. A salt in which the desired end-product atom is contained in the anion is $((CH_3)_4N)_2CoCl_4$. This compound is an ionic salt, in that quaternary ammonia cations and cobalt (II) tetrachloride anions exist in solution. A second example of a compound with an anion containing the desired end product is ammonium metatungstate, $(NH_4)_6H_2W_{12}O_{40}$.

Numerous salts of a wide variety of structures and characteristics can be utilized; limitations on them are few: (1) a practical level of concentration of the salt in the primary solvent is needed to yield a reasonable amount of product per unit weight of the organic components utilized as polymers or extenders; (2) the carrier ions must result in a volatile substance, i.e., the portions of the salt not wanted in the end product (or the oxide thereof) should be freed from the wanted portions by heating and in the presence of the products of thermal degradation of the other solute and solvent ingredients; (3) the metallic component of the desired end product must not form a volatile component under these conditions. The limitations described are easily evaluated and predictable on the basis of chemical thermodynamics in which the enthalpies and free energies of reaction are calculated from known concentrations, temperatures, and atmospheric conditions within the reacting system.

For example, $NiCl_2 \cdot 6H_2O$ will dissolve in water and form $Ni(H_2O)_6^{++}$ and $Cl^-$ ions. When certain polymerization materials are added, the $Ni(H_2O)_6^{++}$ and $Cl^-$ ions are occluded within a polymerized mass. When this mass is burned in air, the carrier ion ($Cl^-$) forms either $Cl_2$ or HCl, both volatile materials that are then removed from the reacting system. The $Ni^{++}$ on the other hand when subjected to the C, $H_2$, CO, $O_2$, $H_2O$, and $CO_2$ in the reaction system forms NiO and/or Ni, depending on the concentration of $O_2$ relative to C, $H_2$, and CO. Neither nickel or nickel oxide is volatile; so the limiting conditions of the invention are satisfied.

However, simple perusal of thermodynamic data is not necessarily adequate. For example, those data indicate that $BaCl_2$ cannot be oxidized up to 1400° K. in a system like the one of this invention. However, according to experimental evidence obtained in practicing the invention, $BaO \cdot 6Fe_2O_3$, barium ferrite, can be so produced from a starting solution of $BaCl_2$ and $FeCl_3$. Apparently, a complex reaction occurs, and $BaCl_2$ in the presence of reaction products of $FeCl_3$ is at least partially oxidized to $BaO \cdot 6Fe_2O_3$, for so it is indicated by X-ray data.

(b) The solute polymer-formers: Polymer-forming materials, natural or synthetic, comprise the second ingredient of the solute. These are materials that under suitable heat, catalyst, or pH conditions polymerize to a firm structure of sufficient mechanical strength so as to not be appreciably distorted during normal handling. Preferably, they also cross-link, for cross-linking acts to severely limit mobility of the salt within the polymer matrix after its formation. The polymer formed must be thermally decomposable and/or oxidizable to a volatile material in the presence of an oxidizing agent and heat. As used herein the term "solid mass" is intended to include such types of structures of which gelatinous masses are one example.

The polymer-forming solute ingredient must be soluble prior to polymerization either in the primary solvent which dissolves the salt, or in a second liquid herein called a secondary solvent which will form a homogeneous single-phase liquid mixture at reasonable concentration with the primary solvent. The metal salt and polymer ingredients should be so chosen that there is no chemical reaction between them that prevents proper performance of either in the solvents actually employed.

Water-soluble lyophilic condensation polymers which cross-link are especially useful; for example, resorcinol-formaldehyde, urea-formaldehyde and phenol-formaldehyde may be used. The greater the lyophilic properties of the polymer, the greater is the tendency for the polymer to contain the solvent and salts in essentially a homogeneous mass upon polymerization. For example, compare resorcinol-formaldehyde with phenol-formaldehyde: resorcinol, with a solubility in water of 229 g./100 ml. at 16° C., is normally a better material to incorporate in the polymer than phenol, with a solubility in water of 6.7 g./100 ml. at 16° C. Few polymers appear to be suitable for this process, because most cross-linked polymers have poor lyophilic properties. Besides formaldehyde, other aldehydes can be used as the copolymer for resorcinal, urea, or phenol, but formaldehyde is preferred because it is the most reactive aldehyde, and commercially it is used almost exclusively for making these types of polymers.

The polymerization reactions themselves are well-known and require no description here, so long as a homogeneous solutions of all solutes is maintained. In the latter connection, it is not necessary to begin with the individual ingredients to form the polymer, for suitable prepolymers can be used.

Acid catalysis can often be employed to speed polymerization. For example, a $NiCl_2$-resorcinol-sugar-HCHO system took over one hour to polymerize without the addition of any catalyst, but upon addition of some HCl polymerization took only 17 minutes. Sulfuric and nitric acids also were found to shorten the time of polymerization.

In the invention, mobility of the salt is limited during polymerization by one of the following:

(a) Chemical reaction, or
(b) Mechanical entrapment.

For the purpose of this invention it is not critical what the mechanism of immobilization of the metallic ion is. For $NiCl_2$, for example, it appears that the fixing of $NiCl_2$ occurs by (b). However, for $FeCl_3$, the reaction for fixing could very well be as follows:

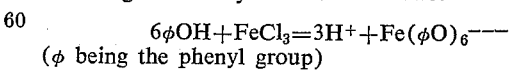

($\phi$ being the phenyl group)

The mechanism by which immobility is imparted to the salt or the metal ion can be different for different metallic species. Also, the time during the process when the metallic species becomes immobile may vary with the different species. In any event, as the polymer is dried or sets, mobility is decreased.

(c) The solute extender: The third solute ingredient is the extender. Sugar is a good one and will serve as an example. It appears to perform several beneficial functions and does not leave impurities in the final product. The polymerization of resorcinol-HCHO is highly exothermic, and if the heat of reaction is not removed during polymerization, the reaction tends to become uncontrollable and may lead to an undesirable polymerizate in which segregation might occur. The sugar acts as an inert filler that tempers the reaction, whether or not the sugar becomes chemicaly bound to the polymer. Further, the sugar aids in producing a homogeneous solution of the salts and polymer; difficulty has been experienced in producing a homogeneous system without sugar or some other extender, such as dextrine, agar-agar, or glycerine.

(d) The starting solution: The starting solution is formed by successive addition to the primary solvent, preferably water for most instances, of the salt or salt mixture, the extender, and the polymer-forming materials either by themselves or dissolved in a secondary solvent. One of the ingredients or conditions (e.g., heat) necessary for initiation of polymerization is withheld from the starting solution, what is omitted being chosen on the basis of ease of handling the resulting solution. Vigorous mixing is carried on during addition of all the solute ingredients to ensure their complete solution. In some cases pre-dissolving of some species may be carried out then, with the "pre-solutions" added to the primary solvent to ensure complete solution or to enhance handling of the various components of the starting solution.

(2) Polymerization

The second step in the invention is the formation of a suitable polymer matrix, containing the dissolved salts of the desired final materials and the extender.

Polymerization may be effected by catalysis or by addition to the solution of an initiator or a critical polymer-forming ingredient, or both together. The catalysis may merely be heating, a pH change by addition of acid or base, or a polymerization agent, such as formaldehyde. If any substance is added to the solution, that is to say, if something other than a temperature change is utilized, it is preferable to add it as a liquid to promote uniformity in the resultant polymer matrix. Desirably, such a catalyst substance should not leave impurities in the final product.

No limitation other than ease of handling and ability to achieve uniformity through mixing is put on the physical size of the polymer solid phase formed. Thus, a large slab of continuous polymer may be formed by polymerizing in a removable container, or discrete particles of polymer may be formed by atomizing the primary solution in the form of liquid droplets into an atmosphere of the polymerizing agent.

As mentioned previously, the resultant polymer has sufficient mechanical strength for handling after formation, and is thermally decomposable or oxidizable to a volatile substance. It is sufficiently cross-linked or otherwise structured so as to severely limit mobility of the salt species.

(3) Thermal degradation

The third step in the invention is thermal degradation of the polymer matrix. This step may be carried out in either an inert atmosphere or in an oxidizing atmosphere.

On heating, most thermosetting or cross-linked polymers, especially in an inert atmosphere or vacuum, degrade to a char. For the purpose of the invention, the polymer can either be (1) charred in an inert atmosphere and used as a char, or (2) charred in an inert atmosphere and then oxidized with oxygen, or (3) a polymer can be put directly into an oxidizing atmosphere at elevated temperature. Water is first evolved then some cross-linking usually occurs, followed by degradation. Degradation at the early stage can be thermal or oxidative or both. Whatever the stages that the reaction goes through, the final product is the fine powder.

An inert atmosphere may be utilized without subsequent oxidation if the polymer matrix and the carrier ions undergo such thermal decomposition as makes them separable from the desired metal compounds or else if the presence of their charred product does not alter the usefulness of the product. In some cases, usefulness may be enhanced by this procedure. Separation may be achieved where the polymer and carrier ions are converted to volatile or soluble molecules, ions, or ion pairs, which can be removed from the product without altering the desired characteristics. A second condition for use of an inert atmosphere is that the chemical reactions resulting from the desired thermal degradation of the polymer produce a desired end product.

These two conditions are generally predictable from thermodynamic considerations of enthalpy and free energy of various reactions, using the known conditions of temperature, concentrations, and materials present.

For instance, if one desires a reduced metal product, inert pyrolysis of a polymer matrix containing hydrogen may be utilized, when the metal in its unreacted state is reducible with hydrogen according to the free energy of this reaction at the reaction temperature to be used. Even if this thermodynamic condition would not be automatically fulfilled, there may be included in the polymer matrix a constituent which, on thermal degradation of that matrix, produces in sufficient concentration a chemical entity that can and will convert the metal ion to a form which is reducible by other ingredients in the resultant chemical mixture. These relationships are also predictable from considerations of enthalpy and free energy of the reactions possible under the conditions of the reaction mixture, including materials present, temperatures, and concentration. Inert pyrolysis may therefore be utilized to produce oxides, mixed oxides, partially reduced metals or alloys, or metal oxide mixtures.

An oxidizing atmosphere may be chosen where the desired end product is an oxide or mixtures thereof, or where the polymer matrix formed during the process of the invention is not thermally decomposable in an inert atmosphere to a suitable reaction mixture, a separable reaction product, or is not so decomposable in an economical manner.

Thermodynamic considerations generally enable prediction of the reaction product of the oxidizing thermal degradation, and the reaction conditions which establish the thermodynamic relationships are controllable as a part of this invention. For example, if it is desired to produce a non-refractory oxide product which free energies show to be reducible by products of the oxidative thermal degradation of the polymer matrix, the process may be controlled as to temperature, concentration of the reducing agents, and reaction-zone dwell time to such an extent so as to ensure production of the desired oxide product.

Thermal degradation can be carried out in a number of types of reactors, such as fluidizers, batch furnaces, continuous furnaces, tray feed, and atomized feed. Which reactor should be used depends largely upon the economics of the particular process chosen.

In addition, further processing of the product of the thermal degradation step may be carried out, where desired. For example, if a reduced metal product is desired and if thermodynamic considerations preclude its formation through inert pyrolysis, oxidative thermal degradation can be employed to produce a finely-divided oxide product which is then reduced by an additional processing step.

An example of oxidative thermal degradation is the production of mixtures of NiO and $ThO_2$. Nickel chloride ($NiCl_2 \cdot 6H_2O$) and thorium nitrate ($Th(NO_3)_6 \cdot 4H_2O$) may be utilized as solute salts, and a carbon-containing polymer employed. In an inert atmosphere the non-refractory oxide (NiO) will be produced either through use of $O_2$ or by $H_2O$ produced by polymer degradation. However, further examination shows that the CO or C also produced on thermal degradation of the polymer will not affect the chloride but will reduce the oxide. Thus, inert pyrolysis of $Ni^{++}$ and $Th^{++++}$ containing polymers produces mixtures of nickel and thorium oxide along with occluded carbon. On the other hand when $O_2$ is present in abundance, as would be the case in an oxidative thermal degradation, the non-refractory oxide is favored, free energywise, over the elemental nickel metal. An oxidizing atmosphere is thus utilized for the production of NiO/ThO$_2$ mixtures.

Among the finely divided sub-micronic products that have been produced by this invention are not only many metals and alloys and metal oxides (as of iron, nickel, cobalt, zinc, copper, sodium, thorium, uranium, and so on) but also many thoriated metals and complex oxides, including various Ni-Th oxides, Ni-Cr-Th oxides, Co-Th oxides, and Cr-Th oxides; thoriated platinum, thoriated copper, thoriated gold, and thoriated silver; cobalt blue, chromium green, and ruby; lithium ferrites such as $(Li_2O)_{1.5}Fe_2O_3$, $(Li_2O)_{1.3}Fe_2O_3$, $(Li_2O)_{1.1}Fe_2O_3$, $$(Li_2O)_{0.9}Fe_2O_3$$

and $(Li_2O)_{0.7}Fe_2O_4$; many other ferrites such as $$(Na_2O)_{1.1}Fe_2O_3$$

$BaO \cdot 6Fe_2O_3$, $MgO \cdot MnO_2 \cdot Fe_2O_3$, $NiO \cdot Fe_2O_3$, $$(NiFe_2O_4)_{0.5}(Fe_3O_4)_{0.5}$$

$[(Li_2O_{1.1}Fe_2O_3]_{0.95}(NiO)_{0.05}$, $Al_2O_3 \cdot Fe_2O_3$, $$MnO_2 \cdot Al_2O_3 \cdot Fe_2O_3$$

$[Li_2O_{1.1}Fe_2O_3]_{0.95}(Al_2O_3)_{0.05}$, and $(Fe_2O_3)(Co,Cr,Zn)$; and other complexes such as Cu in $Al_2O_3$, $CaSiO_3(Mn)$, $ZnAl_2O_4(Mn)$, $PbCrO_4$, $Yb_2O_3 \cdot TiO_2$, and $ZnO \cdot Li_2O$.

A few specific examples follow:

EXAMPLE 1.—PERMALLOY OXIDE

A solution was made to the following ingredients:

| Ingredient: | Parts by weight |
|---|---|
| NiCl$_2$·6H$_2$O | 1279.6 |
| FeCl$_2$·4H$_2$O | 242.0 |
| MoCl$_5$ | 45.6 |
| Sugar | 3153.6 |
| Resorcinol | 2030.4 |
| Water | 4374.0 |

To the above solution was added an amount of 2080 parts by weight of Formalin (36–38% HCHO) to polymerize the system with cross-linking, into a firm mass of material. After polymerization, the mass of material was placed in a furnace at 600° C., with normal air circulation, and the material was burned until all the carbonaceous material was removed from the system. The resultant product was a pure mixture of oxides containing nickel oxide, nickel ferrite and nickel molybdate as indicated by X-ray analysis. The average particle diameter of the end-product oxide mixture was 0.72 to 1.2 micron, as calculated from the surface area which was determined by gas absorption techniques to be 0.97 to 1.66 square meters per gram. This material can be used in magnetic inks and in high-frequency transformer cores.

EXAMPLE 2.—MIXTURE OF CALCIUM AND ZIRCONIUM OXIDES

A solution was made of the following constituents:

| Ingredient: | Parts by weight |
|---|---|
| Ca(NO$_3$)$_2$·4H$_2$O | 31.6 |
| ZrOCl$_2$·4H$_2$O | 242.0 |
| Resorcinol | 179.9 |
| Sugar | 329.0 |
| Water | 702 |
| Concentrated HCl | 16 |

To the above solution were added 193 parts by weight of Formalin (36–38% HCHO) to polymerize the system, with cross-linking, into a firm mass of material. The polymerized mass of material was placed into a furnace at 600° C., with normal air circulation, and the material was burned until all the carbonaceous material was removed from the system. The end product was a fine powder mixture of oxides of calcium and zirconium. By weight, it was 92.5% ZrO and 7.5% CaO.

The resulting oxide was found to press and sinter more readily and satisfactorily than oxides of the same over-all composition which were prepared by "flash drying" in a process similar to that described by Triffleman (U.S. Pat. No. 2,893,859), as shown by the following:

| | Powder prepared by— | |
|---|---|---|
| | Flash drying | This invention |
| Density after sintering at 1,100° C. and pressing at 12,000 p.s.i., grams per cc | 4.4–4.7 | 4.8–4.9 |
| Percent satisfactory (i.e., having an acceptable low porosity) | 75 | 100 |

EXAMPLE 3.—OXIDE OF COMPLEX COBALT ALLOY, WITH AND WITHOUT THORIA

A series of solutions (A) was made of the following constituents as given in the table below:

| Ingredient | Parts by weight | | | | | |
|---|---|---|---|---|---|---|
| | A-1 | A-2 | A-3 | A-4 | A-5 | A-6 |
| CoCl$_2$·6H$_2$O | 1,110.5 | 1,094.5 | 1,077.5 | 1,061 | 1,043.7 | 1,027.2 |
| NiCl$_2$·6H$_2$O | 202.5 | 199.5 | 196.5 | 193.5 | 190.3 | 187.3 |
| (NH$_4$)$_6$·6H$_2$W$_{12}$O$_{40}$ | 100.5 | 99.1 | 97.5 | 96.0 | 94.6 | 93.1 |
| CrCl$_3$·6H$_2$O | 512.5 | 504.5 | 497.5 | 489.5 | 482.3 | 474.6 |
| Th(NO$_3$)$_4$·4H$_2$O | 0 | 15.5 | 31.5 | 47.0 | 62.7 | 78.5 |
| Water | 3,000 | 3,000 | 3,000 | 3,000 | 3,000 | 3,000 |
| Weight percent of thoria[1] | 0 | 1.5 | 3.0 | 4.5 | 6.0 | 7.5 |

[1] Weight percent thoria is calculated in each case on the basis that the remaining oxides are reduced to the metal. Thus, it represents the weight percent thoria in the final alloy.

Another series of solutions (B), each containing the following organic materials, was prepared:

| Ingredient: | Parts by weight |
|---|---|
| Resorcinol | 1458 |
| Sugar | 2682 |
| Concentrated HCl | 109 |
| Water | 1590 |

To prepare the polymer-salt mixture, a solution (A) of the desired thoria content was mixed with a solution (B). Then 1574 parts by weight of Formalin (36–38% HCHO) were added to each solution composed of an A and B mixture, to polymerize and cross-link and form a firm mass of material. The polymeric mass of material was placed into a furnace at 600° C. with normal air circulation, and the material was burned until all the carbonaceous material was removed from the system. The product, a fine powder, was then reduced with hydrogen, and upon reduction the ultimate alloy composition corresponded to an alloy known as type L-605 or Haynes Alloy #25 consisting of about 55 parts Co, 20 Cr, 15 W and 10 Ni with varying amounts of ThO$_2$ between 0 and 7.5 weight percent. This can be used as a dispersion strengthened alloy.

Surface areas and particle diameters of some of these compositions were determined, as follows:

| Percent thoria | Surface area in square meters per gram | | Average diameters in microns | |
|---|---|---|---|---|
| | Oxide | Reduced powder | Oxide | Reduced powder |
| 0 | 29.8 | 0.93 | 0.4 | 0.9 |
| 3 | 30.8 | 2.16 | 0.4 | 0.4 |
| 4.5 | 31.4 | Pyrophoric | 0.4 | |

EXAMPLE 4.—COBALT TITANATE

A salt solution was prepared from the following:

| Ingredient: | Parts by weight |
|---|---|
| $CoCl_2 \cdot 5H_2O$ | 237.95 |
| $TiCl_3$ | 154.3 |
| Water | 260 |

An organic solution of the following was prepared:

| Ingredient: | Parts by weight |
|---|---|
| Resorcinol | 125 |
| Sugar | 230 |
| Water | 250 |

The two solutions were mixed and then 135 parts of Formalin (36–38% HCHO) were added to polymerize the mix, with cross-linking. The polymerizate was then placed in a furnace at 600° C., with normal air circulation, and was burned until all the carbonaceous material was removed.

The X-ray diffraction patterns of the cobalt titanate produced by this process and of cobalt titanate from a commercial source are practically identical, indicating that this process produces material with the same degree of crystalline perfection and gross impurities as does the commercial grade—but in very small particles.

Further comparison of the two materials are:

| | Color | Surface area (square meters per gram) | Average particles (diameter in microns) |
|---|---|---|---|
| This process | Light green | 6.2 | 0.2 |
| Commercial product | Dark green | 1.49 | 0.8 |

EXAMPLE 5.—A THORIATED NICHROME

Complex oxides suitable for partial reduction to dispersion strengthened alloys powders can be made by dissolving:

| Ingredient: | Parts by weight |
|---|---|
| $NiCl_2 \cdot 6H_2O$ | 965 |
| $CrCl_3 \cdot 6H_2O$ | 155 |
| Ammonium molybdate | 55 |
| $Th(NO_3)_4 \cdot 4H_2O$ | 18.8 |
| Water | 2800 |
| Urea | 1200 |
| Sugar | 1800 |

1200 parts by weight of 37% formaldehyde were added, and the solution was then polymerized, with cross-linking. The polymer was dried, charred and oxidized to give a powder having a specific surface area of 25 square meters per gram, or an average particle size of 0.05 micron (compared to an area less than 10 square meters per gram or an average particle size of 0.12 micron obtained by a process using extremely rapid flash drying and subsequent oxidation of aqueous solutions). Thus, it can be seen that this new process obviates the need for extensive ball milling and yields superior products with respect to fine particles and uniform composition than do the state-of-the-art flash-drying methods. Upon reduction by hydrogen at 350° to 1100° C. followed by carbon at 1200° C. at reduced pressure, the ultimate alloy composition corresponded to about 240 parts Ni, 30 parts Cr, 27 parts Mo, and 3 parts $ThO_2$.

EXAMPLE 6.—NICKEL FERRITE

A solution was made of the following ingredients:

| Ingredient: | Parts by weight |
|---|---|
| $FeCl_3 \cdot 6H_2O$ | 46.3 |
| $NiCl_2 \cdot 6H_2O$ | 20.3 |
| Sugar | 77.5 |
| Resorcinol | 42.2 |
| Water | 170 |

To the above solution were added 45 parts by weight of Formalin (36–38% HCHO) to polymerize the system, with cross-linking, into a firm mass of material. The polymer mix was cut into one centimeter cubes and dried at room temperature. The polymer cubes were then burned in a quartz tube, which was inside a tube furnace mounted vertically. A mixture of 13.0 volume percent $O_2$ and 87.0 volume percent $N_2$ was passed up the quartz tube holding the polymer sample, the polymer and tube first being heated to 500° C. After two hours the product was removed and found to be a fine powder with an 87.7 weight percent content of nickel ferrite, as determined by quantitative X-ray analysis. The surface area of the nickel ferrite powder was found to be 2.5 square meters per gram, which corresponds to an average particle size of 0.5 micron.

Using essentially the same general procedure as described above, the following ferrites have been produced: $MnOFe_2O_3$, and $CoOFe_2O_3$, $ZnOFe_2O_3$, and $MgOFe_2O_3$, each as indicated by X-ray spectroscopy.

EXAMPLE 7.—NICKEL OXIDE THORIA AND PURE THORIA

A solution was made of the following ingredients:

| Ingredient: | Parts by weight |
|---|---|
| Resorcinol | 125 |
| Sugar | 230 |
| $NiCl_2 \cdot 6H_2O$ | 188 |
| $Th(NO_3)_4 \cdot 4H_2O$ | 10.5 |
| Water | 510 |
| Conc. HCl | 10.5 |

To the above solution were added 135 parts by weight of Formalin (36–38% HCHO) to polymerize and cross-link the system into a firm mass of material. The polymer mix was then burned in a furnace, with normal air circulation, at 590° C. for 7.5 hours. The product was a fine powder of $NiO-ThO_2$ having a surface area of 2.81 square meters per gram, corresponding to an average particle diameter of about 0.4 micron. This product can be reduced by hydrogen at 350° to 1100° C. to yield pure nickel containing 3% thoria, useful for dispersion strengthened nickel metal. The thoria is not reducible by conventional reducing techniques.

Using the same procedure as above and substituting 188 parts of $Th(NO)_4 \cdot 4H_2O$ for the 188 parts $NiCl_2 \cdot 6H_2O$, a pure $ThO_2$ sample was obtained with a surface area of 29.2 square meters per gram, corresponding to an average particle diameter of about 0.04 micron.

EXAMPLE 8.—NICKEL OXIDE WITH ZIRCONIA

A solution was made of the following ingredients:

| Ingredient: | Parts by weight |
|---|---|
| $NiCl_2 \cdot 6H_2O$ | 1571.2 |
| $Zr(NO_3)_2 \cdot H_2O$ | 24.0 |
| Sugar | 1840.0 |
| Resorcinol | 1000.0 |
| Water | 4000.0 |

To the above solution were added 1080 parts of Formalin (36–38% HCHO) to polymerize the system in a firm cross-linked mass of material. The polymerized mass of material was burned in a tube furnace until all the carbonaceous material was removed from the system. The mixture was a fine powder, whose surface area was found to be 1.34 square meters per gram, corresponding to an average particle size of 0.9 micron in diameter. This product can be reduced as described in Example 7.

EXAMPLE 9.—CHROMIUM-THORIA

A solution was prepared of the following ingredients:

| Ingredient: | Parts by weight |
|---|---|
| $CrCl_3 \cdot 6H_2O$ | 2466 |
| $Th(NO_3)_4 \cdot 4H_2O$ | 31.14 |
| Sugar | 2760 |
| Resorcinol | 1500 |
| Water | 6120 |

To the above solution was added 1620 parts of Formalin (36–38% HCHO) to polymerize the system into a firm cross-linked mass of material. The material was burned at 600° C. in a furnace, with normal air circulation, until all the carbonaceous material was removed from the product. The surface area of the powder was found to be 38 square meters per gram, corresponding to an average particle diameter of 0.03 micron.

A product suitable for use as a dispersion strengthened chrominum metal is obtained by reduction by carbon at 1200° C. under reduced pressure, giving 97% Cr metal and 3% thorin, by weight.

EXAMPLE 10.—BARIUM FERRITE

A solution was prepared of the following ingredients:

| Ingredient: | Parts by weight |
|---|---|
| $BaCl_2 \cdot 2H_2O$ | 24.4 |
| $FeCl_3 \cdot 6H_2O$ | 324.4 |
| Resorcinol | 286.3 |
| Sugar | 445.0 |

Sufficient water was employed to prepare a homogeneous solution of these ingredients. Then 106.8 parts by weight of Formalin (36–38% HCHO) were added to the solution to polymerize the whole into a firm mass of material. The sample was burned in a quartz tube, and the maximum observed temperature of the reaction was 875° C. X-ray analysis of the product showed the presence of barium ferrite. Many other unidentified materials were formed as indicated by the X-ray pattern. The reaction was not complete since soluble chloride was found in this product.

EXAMPLE 11.—CONCENTRATION EFFECT ON PARTICLE SIZE

Four solutions of the following composition were prepared:

| Ingredient: | Parts by weight |
|---|---|
| Resorcinol | 125 |
| Sugar | 230 |
| Water | 510 |
| HCl conc. | 10.5 |

To each solution 135 parts by weight of Formalin and a certain amount of $NiCl_2 \cdot 6H_2O$ were added, and the mixture was polymerized to a firm mass of material. $NiCl_2 \cdot 6H_2O$ weight percentages in the four solutions were:

| | Percent |
|---|---|
| (A) | 11.7 |
| (B) | 5.8 |
| (C) | 2.9 |
| (D) | 1.4 |

Each product was then burned in a furnace with normal air circulation at 650° C. for 16 hours.

Average particle sizes of the NiO product were determined in conjunction with a Perkin-Elmer-Shell Sorptometer as follows:

| | Diameter (microns) |
|---|---|
| (A) | .90 |
| (B) | .70 |
| (C) | .57 |
| (D) | .51 |

EXAMPLE 12.—USE OF AN ACRYLIC POLYMER

A solution of the following composition was prepared:

| Ingredient: | Parts by weight |
|---|---|
| Glacial acrylic acid | 242 |
| Water | 75 |
| $HNO_3$ (dilute) | 5.0 |
| $NiCl_2 \cdot 6H_2O$ | 51.4 |
| $Th(NO_3)_4 \cdot 4H_2O$ | 0.635 |
| Benzyl peroxide | 1.2 |

The solution was mildly heated, and a transparent green polymer system resulted. Oxidation of this polymer in air produced a $NiO/ThO_2$ mixture. X-ray and emission spectra confirmed the presence of the metallic species.

The acrylic acid system is not generally considered to be of a cross-linked nature when polymerized. However, the polymer which resulted in this case retained its shape and general spatial configuration during heating and burning, characteristics which usually characterize a cross-linked polymer in that it does not melt.

EXAMPLE 13.—USE OF PHENOL-FORMALDEHYDE POLYMERS SYSTEM

Phenol formaldehyde polymers generally require pressure equipment for polymerization in order to prevent loss from the system of the polymerization reaction vehicle. In ordinary preparation, the water-salt-phenol/HCHO system is limited to salt concentrations below 2%; however, the limiting salt concentration can be raised to 18% by the addition of acetic acid (9%) to the basic system, or it can be raised to 22% by the addition of 11% methanol to the basic system. The limiting concentration is that which causes phase separation, and higher concentrations result in a polymerization that will not yield a homogeneous product.

Examples of two suitable solutions employing phenol formaldehyde are as follows:

(A) Phenol formaldehyde with acetic acid

| Ingredient: | Parts by weight |
|---|---|
| Phenol | 3.2 |
| $NiCl_2 \cdot 6H_2O$ | 2.0 |
| $H_2O$ | 5.0 |
| Acetic acid | 1.0 |

(B) Phenol formaldehyde with methanol

| Ingredient: | Parts by weight |
|---|---|
| Phenol | 3.2 |
| $NiCl_2 \cdot 6H_2O$ | 2.0 |
| $H_2O$ | 3.0 |
| $CH_3OH$ | 1.0 |

EXAMPLE 14.—PERMALLOY POWDER

Permalloy powders, containing about 4 weight percent molybdenum, 17 weight percent iron, and 79 weight percent nickel, and possessing an average particle size of 0.3 micron has been produced by the process of this invention. The finest commercially available grades of similar powders have particles larger than 3–5 microns. Consequently, use of these powders has been limited. The micro-particle system is based on the low temperature (~400–500° C). hydrogen reduction of mixed oxides. These oxides, specifically nickel oxide, nickel ferrite and nickel molybdate are very fine and are so intimately mixed that complete alloying and minimum sintering into large particles occurs during reduction. This is an unexpected and unique feature of this process.

The mixed oxide powders and reduced alloy powders were characterized by gas adsorption and electron microscopy for particle size, and by X-ray diffraction for oxide composition and degree of alloying. All of the nickel-oxide, and nickel-ferrite X-ray diffraction lines were detectable, and only a few nickel-molybdate lines were present, since that component is apparently present in small quantities and line broadening occurs because of the extremely small particle size, the average particle diameter was about 0.1 micron, as determined by gas adsorption and electron microscopy.

Lattice constants for the powdered alloy, calculated from X-ray diffraction patterns, show that as much as 3.5 percent of the molybdenum enters into solid solution to give a value of $A_0=3.555$ angstrom units. Every detectable line in the diffraction pattern is a reflection from the face-center-cubic lattice of the nickel solid solution. No lines of body-centered iron or molybdenum, or any other combination of these elements were present.

Several magnetic properties of the powdered alloy were measured and found reasonably close to expected values. The saturation induction is 9800 gausses compared to about 9000 for bulk material of the same composition. A coercive force of 10 oersteds was measured on top-density powders. Comparable data pertaining to similar powders made by different processes are not available.

Permalloy powders of the type produced by this process have potential applications in several areas. The low coercive force and high saturation induction are desirable properties for magnetic inks, as well as for pressing into high frequency transformer cores.

EXAMPLE 15.—COMPARISON OF TWO GOOD EXTENDERS

Two samples were prepared in the following proportions:

| Ingredient: | Parts by weight |
|---|---|
| Resorcinal | 125 |
| Extender | 230 |
| $NiCl_2 \cdot 6H_2O$ | 188 |
| $H_2O$ | 510 |
| Conc. HCl | 10.5 |
| Formalin | 135 |

In one case sugar was used as the extender; in the other case glycerin was used. Polymerization proceeded as in preceding examples, followed by oxidation at 600° C. for 16 hours. The comparative surface areas were determined for the NiO product: where sugar was the extender, 1.0 m.²/gm. and where glycerin was the extender 1.2 m.²/gm.

What is claimed is:

1. A method for making finely divided metal-containing particles, comprising:
   polymerizing a co-solution of
   solute (a) polymer-forming ingredients which form a thermally degenerable polymer upon polymerization and solute (b) at least one metal salt to form a solid mass,
   completely thermally degenerating said polymer, and
   recovering the finely divided metal-containing particles remaining after the degenerating steps.

2. The method of claim 1 wherein while said polymer is thermally degenerated it is simultaneously oxidized so as to produce a carbon-free metal oxide in finely divided particles.

3. The method of claim 1 wherein after said polymer is thermally degenerated it is oxidized to produce a carbon-free metal oxide in finely divided particles.

4. The method of claim 1 wherein said polymer is thermally degenerated in an inert atmosphere, producing a mixture of carbon and metal-containing particles.

5. The method of claim 1 wherein said polymer is thermally degenerated in a reducing atmosphere to produce metal particles.

6. A method for making finely divided metal oxide particles, comprising:
   polymerizing with cross-linking a solution of lyophilic polymer-forming ingredients containing a significant amount of metal ions, to form a solid mass, and
   heating and oxidizing said mass to eliminate carbon therefrom, to give finely divided metal oxide particles.

7. The method of claim 6 wherein the solution contains only metal ions of a desired end product and materials and ions which are thermally degenerable to volatile products.

8. A method for making finely divided metal-containing particles, comprising:
   dissolving in a volatile solvent a solute comprising
   (a) one or more metal salts comprised of metal ions and of ions that result in volatile matter when heated in this method,
   (b) polymer forming ingredients, and
   (c) an insert extender,
   polymerizing said polymer-forming ingredients to form a solid mass with said metal ions entrapped therein,
   thermally degenerating said mass to eliminate volatile matter therefrom, and
   recovering the finely divided particles that then remain.

9. The method of claim 8 wherein said thermal degeneration step is accompanied by oxidation to free the product from carbon.

10. The method of claim 9 wherein said oxidation and thermal degeneration are followed by reducing said product to remove oxygen therefrom.

11. A method for making finely divided metal oxide particles, comprising:
    polymerizing to a solid mass a water solution of resorcinol-formaldehyde, sugar, and one or more metal salts having its non-metallic ions volatizable, and
    heating and oxidizing said mass to eliminate carbon and volatile matter therefrom to produce the oxides of the metals of said salts in particles averaging less than one micron in diameter.

12. A method for making finely divided metallic particles, comprising the steps of:
    dissolving at least one metal compound and at least one constituent of a lyophilic polymer in a solvent,
    adding to said solution the remaining constituents of said polymer and initiating polymerization,
    polymerizing said constituents to form a solid mass incorporating said metal compound,
    charring and oxidizing said polymer to give a finely divided metal oxide, and
    reducing said oxide.

13. A method for making finely divided metal alloy particles, comprising the steps of:
    forming a solution in a volatile solvent containing metal ions of the said alloy in the proportions desired in said final product and containing polymer-forming ingredients,
    initiating polymerization in said solution and polymerizing said constituents with cross-linking to form a solid mass incorporating said metal compound,
    charring and oxidizing said polymer to give a finely divided metal oxide, and
    reducing said oxide.

14. A method for making submicronic particles of a pure metal oxide, comprising the steps of:
    dissolving a pure salt of said metal in water, said salt having its other components volatilizable,
    dissolving phenol and resorcinol and sugar or glycerine in said water,
    polymerizing the phenol resorcinol with cross-linking to form a solid mass incorporating said metal ions, and
    charring and oxidizing said polymer to eliminate volatile components and carbon and give the finely divided said metal oxide.

15. The method of claim 14 followed by reducing said oxide to a pure metal in finely divided form.

References Cited

UNITED STATES PATENTS 3,342,910    9/1967    Ishihara et al. _____ 264—0.5

L. DEWAYNE RUTLEDGE, Primary Examiner

W. W. STALLARD, Assistant Examiner